(12) United States Patent
Dow et al.

(10) Patent No.: US 11,914,043 B2
(45) Date of Patent: Feb. 27, 2024

(54) SYNTHETIC BATHYMETRY GENERATION USING ONE OR MORE FRACTAL TECHNIQUES

(71) Applicant: International Business Machines Corporation, Armonk, NY (US)

(72) Inventors: Eli Michael Dow, Pleasant Valley, NY (US); Michael E Henderson, South Salem, NY (US); Campbell D Watson, Brooklyn, NY (US); Guillaume A. R. Auger, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 558 days.

(21) Appl. No.: 17/151,514

(22) Filed: Jan. 18, 2021

(65) Prior Publication Data

US 2022/0229185 A1 Jul. 21, 2022

(51) Int. Cl.
*G01S 17/89* (2020.01)

(52) U.S. Cl.
CPC .................... *G01S 17/89* (2013.01)

(58) Field of Classification Search
CPC ........ G01S 17/89; G01S 17/42; G01S 7/4817; G01S 17/86; G01S 7/4808; G01S 17/894; G01S 17/87; G01S 17/88; G01S 13/89; G01S 13/865; G01S 7/003; G01S 15/89; G06T 2207/10028; G06T 7/521;

(Continued)

(56) References Cited

U.S. PATENT DOCUMENTS

| 7,260,272 B2 | 8/2007 | Lin et al. |
| 8,903,134 B2 | 12/2014 | Abileah |
| 2002/0060685 A1 | 5/2002 | Handley et al. |

(Continued)

FOREIGN PATENT DOCUMENTS

CN 103591939 A * 2/2014 ............. G01C 11/02

OTHER PUBLICATIONS

Williams et al., "Generating synthetic fjord bathymetry for coastal Greenland", The Cryosphere, vol. 11, 2017, pp. 363-380. (Year: 2017).*

(Continued)

*Primary Examiner* — Tarun Sinha
*Assistant Examiner* — Drexel Alejandro Venero
(74) *Attorney, Agent, or Firm* — Anthony Curro

(57) ABSTRACT

Method, apparatus, and computer program product are provided for generating synthetic bathymetry using one or more fractal techniques. In some embodiments, real terrain data generated from sensor-based measurement of terrain associated with but outside a water body are received. This data may include, for example, real terrain data generated from sensor-based measurement (e.g., LiDAR) of at least a portion of an area proximate the water body. One or more fractal dimensions is/are extracted from the real terrain data, and synthetic bathymetry of the water body is generated based on the one or more fractal dimensions using one or more fractal terrain generation techniques. In some embodiments, one or more simulated geological processes is/are applied to the synthetic bathymetry. For example, a simulated sedimentation process and/or a simulated erosion process may be applied to soften the synthetic bathymetry.

20 Claims, 8 Drawing Sheets

(58) Field of Classification Search
CPC ........... G06T 17/05; G06T 7/50; G06T 17/00; G06T 2200/04; G06T 7/13
See application file for complete search history.

(56) References Cited

U.S. PATENT DOCUMENTS

| | | | | |
|---|---|---|---|---|
| 2008/0167847 | A1* | 7/2008 | Parenthoen | G06F 30/20 703/6 |
| 2011/0208498 | A1* | 8/2011 | Le Gal | G06F 30/23 703/9 |
| 2012/0101795 | A1* | 4/2012 | Blain | G06F 30/20 703/9 |
| 2013/0050210 | A1* | 2/2013 | Michopoulos | G06F 17/10 345/420 |
| 2013/0202193 | A1* | 8/2013 | Rahmes | G06T 17/00 382/154 |
| 2014/0333616 | A1 | 11/2014 | Ghyme et al. | |
| 2017/0167254 | A1* | 6/2017 | Fotland | G01V 99/005 |
| 2020/0264290 | A1* | 8/2020 | Napolitano | G01S 15/89 |

OTHER PUBLICATIONS

Lv et al., "The Application of a Complex Composite Fractal Interpolation Algorithm in the Seabed Terrain Simulation", Hindawi, Mathematical Problems in Engineering, vol. 2018, 2018, 7 pages. (Year: 2018).*

Bird et al., "Techniques for Fractal Terrain Generation", 23 pages, downloaded from <https://web.williams.edu/Mathematics/sjmiller/public_html/hudson/Dickerson_Terrain.pdf> on Aug. 3, 2020. (Year: 2020).*

Williams et al., "Generating synthetic fjord bathymetry for coastal Greenland", The Cryosphere, vol. 11, 2017, pp. 363-380.

Lv et al., "The Application of a Complex Composite Fractal Interpolation Algorithm in the Seabed Terrain Simulation", Hindawi, Mathematical Problems in Engineering, vol. 2018, 2018, 7 pages.

Xi et al., "Marine Sediment Mapping Using Multi-Source and Multi-Dimensional Acoustic Images Based on Evidential Fusion", Conference Paper at IGARSS 2018, 2018, pp. 4993-4996.

Bird et al., "Techniques for Fractal Terrain Generation", 23 pages, downloaded from <https://web.williams.edu/Mathematics/sjmiller/public_html/hudson/Dickerson_Terrain.pdf> on Aug. 3, 2020.

Klinkenberg et al., "The Fractal properties of topography: A comparison of methods", Abstract, 3 pages, printed from <https://asu.pure.elsevier.com/en/publications/the-fractal-properties-of-topography-a-comparison-of-methods> on Jan. 1, 2021.

Milne, Bruce T., "Measuring the fractal geometry of landscapes", Abstract, 2 pages, printed from <https://www.sciencedirect.com/science/article/abs/pii/0096300388900999> on Aug. 3, 2020.

Unknown, "World Creator—The Real-Time Terrain Generator and Landscape Generator", 16 pages, printed from <https://www.world-creator.com/> on Aug. 3, 2020.

Van Pabst et al., "Dynamic Terrain Generation Based on Multifractal Techniques", 18 pages, downloaded from <http://citeseerx.ist.psu.edu/viewdoc/download;jsessionid=9E778BF2E2A8764C4CEAA335BFA1D164?doi=10.1.1.116.266&rep=rep1&type=pdf > on Aug. 4, 2020.

Pecknold et al., "Stratified multifractal magnetization and surface geomagnetic fields—II. Multifractal analysis and simulations", Geophysical Journal International, vol. 145, 2001, pp. 127-144.

Harvey et al., "Synthetic Terrain Generation Including Fractal Terrain Generation and Terrain Type Data Generation", U.S. Appl. No. 09/560,886, filed Apr. 28, 2000, 53 pages.

Mell et al., "The NIST Definition of Cloud Computing", National Institute of Standards and Technology, NIST Special Publication 800-145, Sep. 2011, 7 pages.

Carpenter, Loren, "Vol Libre", 3 pages, printed from <https://vimeo.com/5810737> on Jan. 1, 2021.

Unknown, "OpenSimulator", 3 pages, printed from <http://opensimulator.org/wiki/Main_Page> on Jan. 1, 2021.

Unknown, "Discrete wavelet transform", Wikipedia, 11 pages, downloaded from <https://en.wikipedia.org/w/index.php?title=Discrete_wavelet_transform&oldid=998666096> on Jan. 18, 2021.

Unknown, "Perlin noise", fuzzy notepad, 16 pages, printed from <https://eev.ee/blog/2016/05/29/perlin-noise/> on Jan. 18, 2021.

* cited by examiner

SYNTHETIC BATHYMETRY GENERATION USING ONE OR MORE FRACTAL TECHNIQUES

BACKGROUND

The present invention relates in general to the field of generating bathymetry. More particularly, the present invention relates to generating synthetic bathymetry using one or more fractal techniques.

SUMMARY

Embodiments of the present disclosure include a method, apparatus, and computer program product for generating synthetic bathymetry using one or more fractal techniques. In some embodiments, real terrain data generated from sensor-based measurement of terrain associated with but outside a water body are received. This data may include, for example, real terrain data generated from sensor-based measurement (e.g., LiDAR) of at least a portion of an area proximate the water body. One or more fractal dimensions is/are extracted from the real terrain data, and synthetic bathymetry of the water body is generated based on the one or more fractal dimensions using one or more fractal terrain generation techniques. In some embodiments, one or more simulated geological processes is/are applied to the synthetic bathymetry. For example, a simulated sedimentation process and/or a simulated erosion process may be applied to soften the synthetic bathymetry.

BRIEF DESCRIPTION OF THE SEVERAL VIEWS OF THE DRAWINGS

Embodiments will hereinafter be described in conjunction with the appended drawings, where like designations denote like elements.

DETAILED DESCRIPTION

Figure 1:
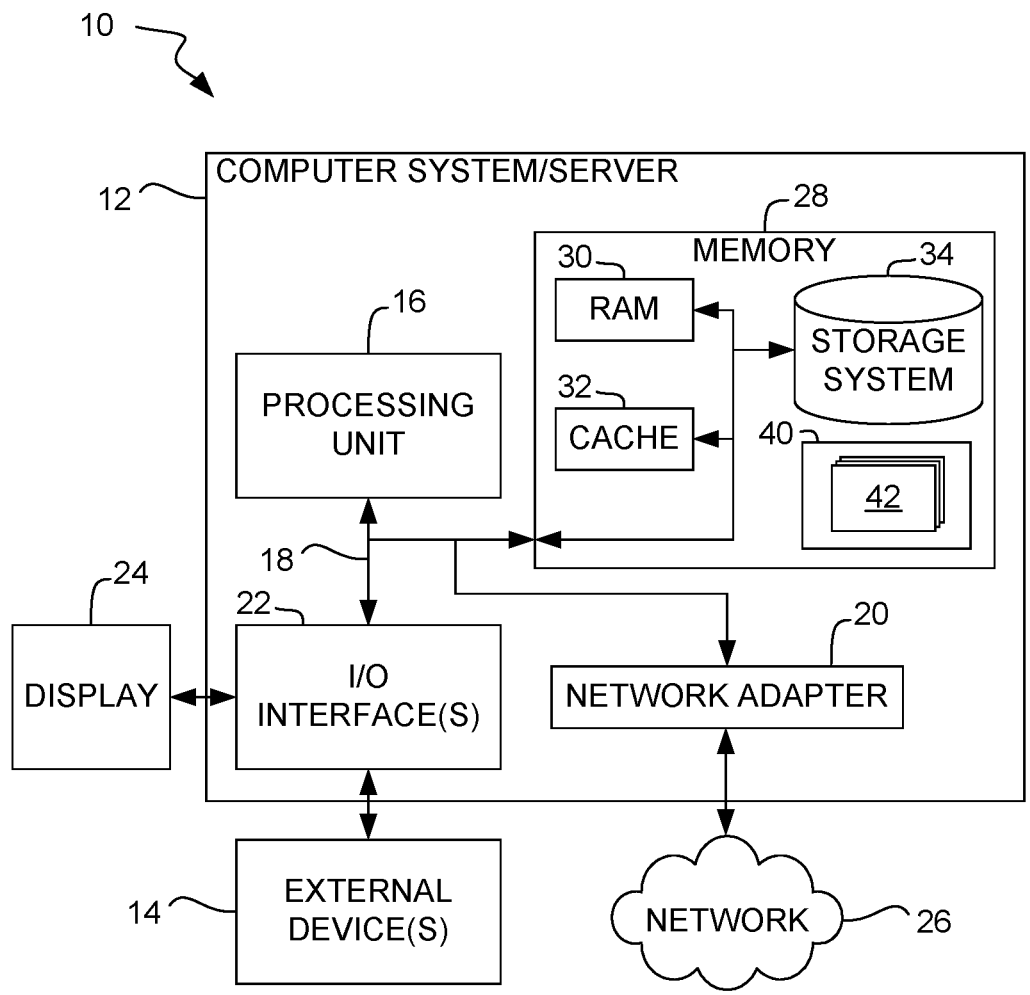
FIG. 1 depicts a cloud computing node, according to one or more embodiments.

Circulation (or hydrodynamic) models are used in many applications, including applications within marine, aquaculture, agriculture, energy, shipping, and other sectors. For example, circulation models can be used to track spills in a water body, as well as pollution tracking and dispersion in a water body, develop damage models based on wave action, and simulate nutrient cycles that can lead to harmful algal blooms or HABs (e.g., Red Tide in Florida).

To run a 3-D circulation model for a water body (e.g., ocean, lake, natural reservoir, river, etc.), for example, it is very important to know the shape of the bottom of the water body, known as bathymetry. This shape, along with the shoreline, can be very important when simulating the flow dynamics. A straightforward example of this is a water body having a ledge (instead of a flat bottom) that enhances the upwelling of nutrient-rich deep water that can encourage an algal bloom.

However, accurate bathymetric data is difficult to obtain. Manually sampled depth probes are time consuming to operate and often sparse. Bathymetric LiDAR campaigns to obtain bathymetric data, for example, are expensive. LiDAR, which stands for Light Detection and Ranging, is a method of measuring distances (also known as "ranging") by illuminating a target (e.g., overland terrain in the case of topographic LiDAR, and a water body in the case of bathymetric LiDAR) with laser light and measuring the returned laser reflection with a sensor. Differences in laser reflection return times and wavelengths can then be used to make digital 3-D representations of the target (e.g., digital elevation maps (DEMs)). Topographic LiDAR typically uses a near-infrared laser to map overland terrain. Bathymetric LiDAR typically uses water-penetrating green light laser to map underwater terrain (e.g., seafloor, lake bottom, and riverbed elevations).

In accordance with some embodiments, a method, apparatus, and computer program product are provided for generating synthetic bathymetry using one or more fractal techniques. In some embodiments, real terrain data generated from sensor-based measurement of terrain associated with but outside a water body (e.g., overland terrain surrounding the water body) are received. This data may include, for example, real terrain data generated from sensor-based measurement (e.g., LiDAR) of at least a portion of an area proximate the water body. One or more fractal dimensions is/are extracted from the real terrain data, and synthetic bathymetry of the water body is generated based on the one or more fractal dimensions using one or more fractal terrain generation techniques. This approach rests on the assumption that overland terrain surrounding a water body is likely to resemble the bathymetry of the water body in some sense. In some embodiments, one or more simulated geological processes is/are applied to the synthetic bathymetry. For example, a simulated sedimentation process and/or a simulated erosion process may be applied to soften the synthetic bathymetry as would happen in the real world.

Fractal techniques typically rely on a few dimensions to generate synthetic terrain. Properties of the synthetic terrain, such as smoothness and "cragginess", are determined by these dimensions.

Algorithms for generating fractal landscapes typically fall into the following general form:
1. Start with a zero terrain height $h(x, y)$, on a terrain grid sized $nx \times ny$ (finest);
2. For each scale (frequency/octave) less (coarser) than the resolution of the finest terrain grid:
    a. Generate a spatial distribution of displacements at this scale from a distribution. The size of the displacement is the energy in that scale.
    b. Interpolate the spatial distribution of displacements to the finest terrain grid and sum into the terrain height $h(x, y)$.

The terrain grids may, for example, successively halve the number of grid points from the finest terrain grid with each successively coarser terrain grid.

The spatial distribution (displacement) has an amplitude (energy) which decreases with the scale $a(\omega)$. There are many types of spatial distribution $h(x, y)$ (or noise) including, but not limited to, midpoint displacement, Perlin noise, and ridge noise. In the case of midpoint displacement—zero on next coarser, random variable OW. In the case of Perlin noise—random gradient vectors are blended. In the case of ridge noise—the function $1-|\sin x|$ has sharp peaks and round bottoms, so use $1-|\text{noise}(x, y)|$.

In accordance with some embodiments, a method, apparatus, and computer program product are provided for generating synthetic bathymetry by obtaining real terrain data generated from sensor-based measurement of terrain surrounding a water body, extracting fractal dimensions from the visible portion of the terrain (above water), and using the extracted fractal dimensions to construct, using one or more fractal terrain generation techniques, a subsurface topography (bathymetry). In some embodiments, as a second order step, to represent sedimentation, low spots in the fractal generated bathymetry may be filled in using another approximation term. Typically, this approximation term is mostly driven by the geological age of the lake and known sedimentation rates. Yet other approximation terms may be incorporated to simulate other geological processes, such as erosion. Still other approximation terms may be incorporated to simulate the history of formation (e.g., glaciation).

A rapidly growing information technology (IT) delivery model is cloud computing, by which shared resources, software, and information are provided over the Internet to computers and other devices on-demand. Cloud computing can significantly reduce IT costs and complexities while improving workload optimization and service delivery. With this approach, an application instance can be hosted and made available from Internet-based resources that are accessible through a conventional Web browser over HTTP. An example application might be one that provides a common set of messaging functions, such as email, calendaring, contact management, and instant messaging. A user would then access the service directly over the Internet. Using this service, an enterprise would place its email, calendar, and/or collaboration infrastructure in the cloud, and an end user would use an appropriate client to access his or her email, or perform a calendar operation.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, as well as removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"), and other non-removable, non-volatile media (e.g., a "solid-state drive"). Although not shown, a magnetic disk drive for reading from and writing to a removable, non-volatile magnetic disk (e.g., a "floppy disk"), and an optical disk drive for reading from and/or writing to a removable, non-volatile optical disk such as a CD-ROM, DVD-ROM or other optical media can be provided. In such instances, each can be connected to a bus 18 by one or more data media interfaces. As will be further described below, memory 28 may include a computer program product storing a set (e.g., at least one) of program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. In some embodiments, program modules 42 are adapted to generally carry out the one or more functions and/or methodologies of one or more embodiments.

Computer system/server 12 may also communicate with one or more external devices 14 such as a keyboard, a pointing device, a display 24, etc.; one or more devices that enable a user to interact with computer system/server 12; and/or any device (e.g., network card, modem, etc.) that enable computer system/server 12 to communicate with one or more other computing devices. Such communication can occur via Input/Output (I/O) interfaces 22. Still further, computer system/server 12 can communicate with one or more networks such as a local area network (LAN), a general wide area network (WAN), and/or a public network (e.g., the Internet) via network adapter 20. As depicted, the network adapter 20 communicates with other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
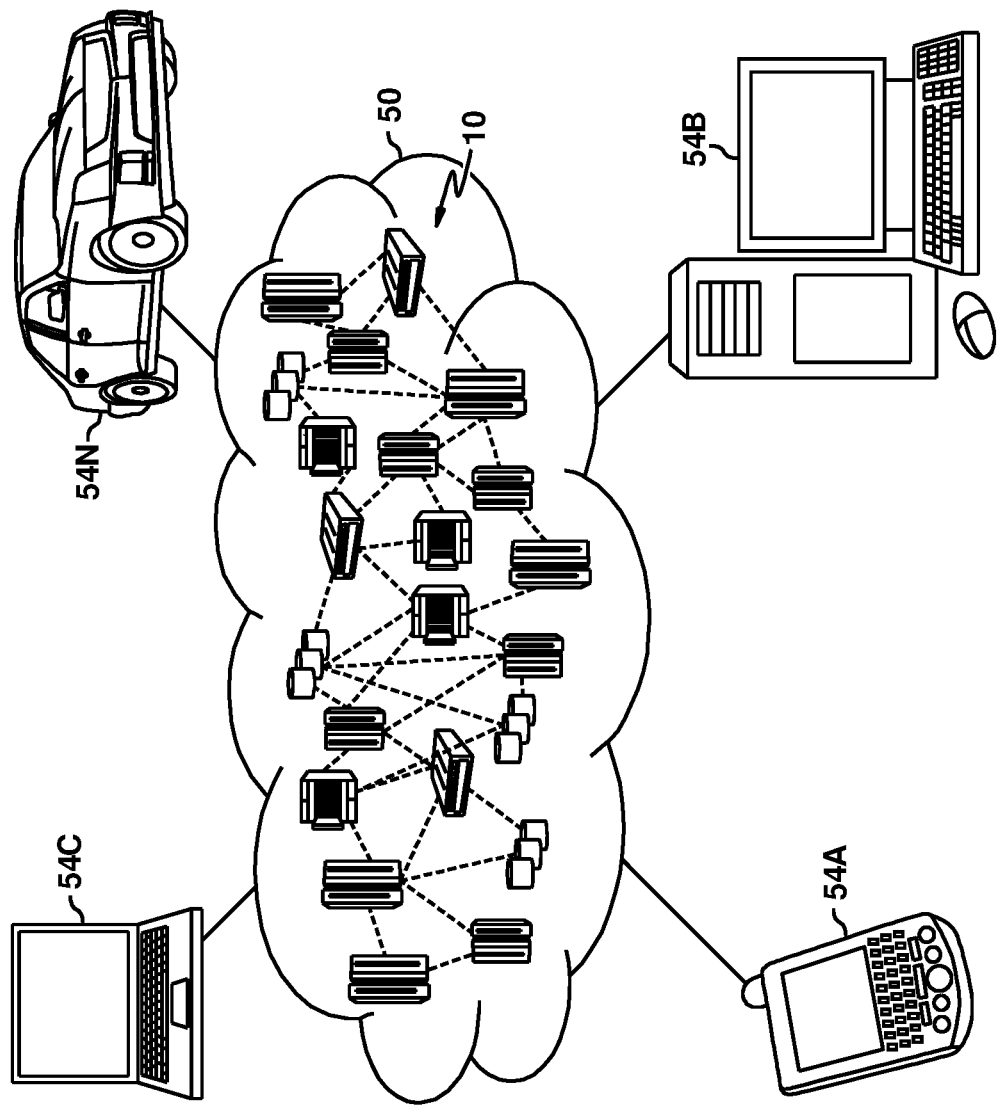
FIG. 2 depicts a cloud computing environment, according to one or more embodiments.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
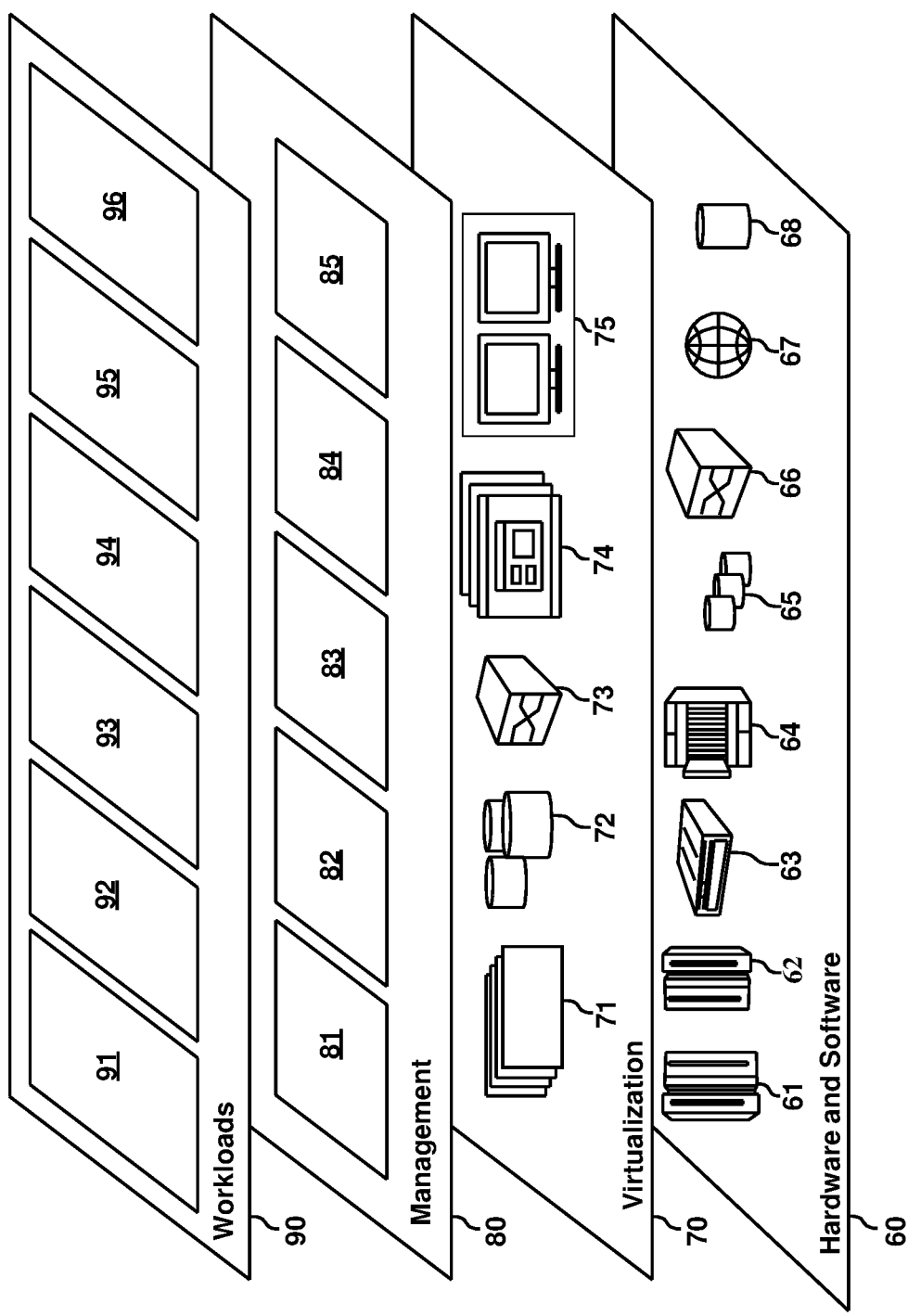
FIG. 3 depicts abstraction model layers, according to one or more embodiments.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and synthetic bathymetry generation 96.

Figure 4:
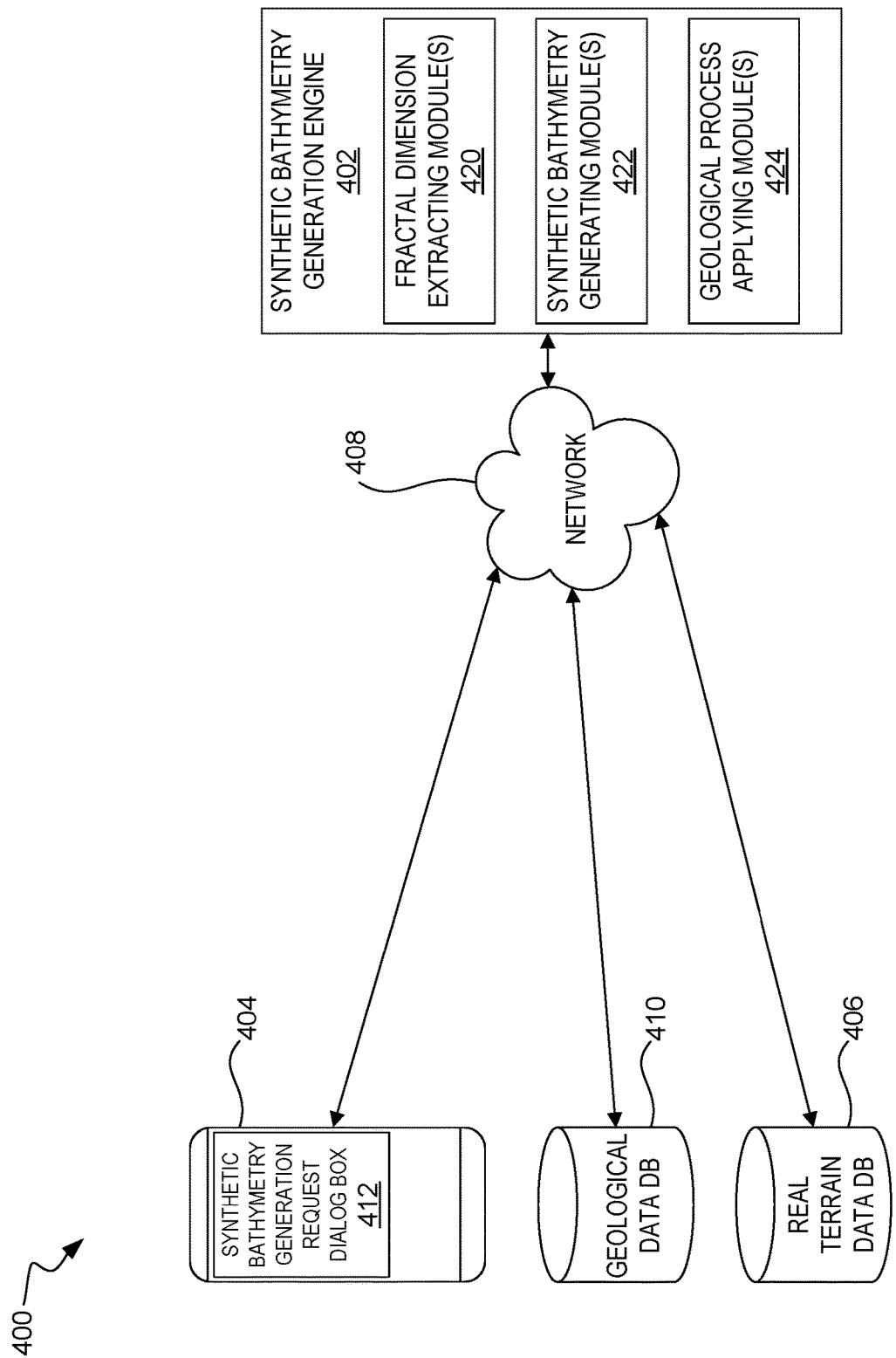
FIG. 4 depicts an exemplary system for generating synthetic bathymetry, according to one or more embodiments.

Referring now to FIG. 4, an exemplary system 400 for generating synthetic bathymetry is depicted, in accordance with one or more embodiments. The exemplary system 400 illustrated in FIG. 4 includes at least one synthetic bathymetry generation engine 402 in communication with one or more user electronic devices, such as cellular phone 404, and at least one real terrain data database 406 over one or more networks 408. Such networks 408 may include wired and wireless networks, including, but not limited to, a cellular network, a wide area network (WAN) (e.g., the Internet), and/or a local area network (LAN), non-limiting examples of which include cellular, WAN, wireless fidelity (Wi-Fi), Wi-Max, WLAN, radio communication, microwave communication, satellite communication, optical communication, sonic communication, electromagnetic induction communication, quantum communication, and/or any other suitable communication technology.

The real terrain data database 406 contains real terrain data generated from sensor-based measurement of overland terrain obtained by satellite, aircraft, drone, and the like. The real terrain data database 406 may, for example, contain one or more digital elevation maps (DEMs) of overland terrain, including shoreline data defining the shape and features of the shoreline of the water body.

In the exemplary system 400 illustrated in FIG. 4, the synthetic bathymetry generation engine 402 is also in communication with at least one geological data database 410 over the one or more networks 408. The one or more geological data database 410 contains geological data such as the geological age of each of one or more bodies of water, sedimentation rates, erosion rates, and the like.

In some embodiments, the cellular phone 404 may send a synthetic bathymetry generation request to the synthetic bathymetry generation engine 402 over the one or more networks 408. For example, the cellular phone 404 may send the synthetic bathymetry generation request to the synthetic bathymetry generation engine 402 in response to a user interacting with a synthetic bathymetry generation request dialog box 412 displayed on the cellular phone 404. The synthetic bathymetry generation request dialog box 412 may contain fields for user input of information such as UserID, Password, and the identity of the water body for which generation of synthetic bathymetry is requested.

The synthetic bathymetry generation request, in some embodiments, may include location data representing a location (e.g., GPS-based) of the cellular phone 404. For example, in accordance with some of the embodiments of the present invention, the user may be utilizing the cellular phone 404 to request generation of the synthetic bathymetry of a water body while present near the water body (e.g., at the shoreline of the water body) and the synthetic bathymetry generation request may include GPS-based location data representing the user's location, which may be utilized by the synthetic bathymetry generation engine 402 to identify the water body.

The synthetic bathymetry generation request, in some embodiments, may include real terrain data generated from sensor-based measurement of terrain associated with but outside the water body. For example, in accordance with some embodiments of the present invention, the synthetic bathymetry generation request may include a data file uploaded by the user that contains real terrain data generated from sensor-based measurement (e.g., using a LiDAR sensor mounted on an aerial drone) of at least a portion of an area proximate the water body.

In the exemplary system 400 illustrated in FIG. 4, the synthetic bathymetry generation engine 402 includes one or more fractal dimension extracting module(s) 420, one or more synthetic bathymetry generating module(s) 422, and one or more geological process applying module(s) 424. The one or more fractal dimension extracting module(s) 420, the one or more synthetic bathymetry generating module(s) 422, and/or the one or more geological process applying module(s) 424 may be separate components as shown in the exemplary system 400 illustrated in FIG. 4, or may be combined in total or in part.

In some embodiments, the one or more fractal dimension extracting module(s) 420 of the synthetic bathymetry generation engine 402 may receive real terrain data generated from sensor-based measurement of terrain associated with but outside a water body for which synthetic bathymetry is to be generated, and extract one or more fractal dimensions from the real terrain data.

For example, in some implementations, the one or more fractal dimension extracting module(s) 420 may search one or more databases, such as the real terrain data database 406, to identify pertinent real terrain data, and extract one or more fractal dimensions from the pertinent real terrain data. The one or more fractal dimension extracting module(s) 420 may identify pertinent real terrain data by, for example, searching for real terrain data generated from sensor-based measurement of terrain within a threshold distance from the shoreline of the water body. Such pertinent real terrain data may include one or more digital elevation maps.

In other implementations, the one or more fractal dimension extracting module(s) 420 may search one or more databases (not shown) containing imagery of terrain obtained by satellite, aircraft, aerial drone, and the like to identify pertinent imagery, generate real terrain data (e.g., one or more digital elevation maps) based on the identified pertinent imagery, and extract one or more fractal dimensions from the real terrain data. The one or more fractal dimension extracting module(s) 420 may identify pertinent imagery by, for example, searching for imagery of terrain within a threshold distance from the shoreline of the water body.

In still other implementations, the one or more fractal dimension extracting module(s) 420 may receive real terrain data uploaded by the user, and extract one or more fractal dimensions from the uploaded real terrain data. The real terrain data (e.g., one or more digital elevation maps) may be uploaded by the user, for example, as part of the synthetic bathymetry generation request.

In accordance with some embodiments of the present invention, the one or more fractal dimension extracting module(s) 420 starts with a terrain (i.e., the real terrain data) and extracts the spatial distribution. For example, the one or more fractal dimension extracting module(s) 420 may, first, decompose the terrain into scales and, second, extract the spatial distribution.

1. Decompose the Terrain into Scales

Decomposition of the terrain into scales may be accomplished using a Fourier transform. In this regard, there are directions X and y, frequencies $\omega_i = 2\pi i/n$ and $\omega_j = 2\pi j/m$, with wavelengths, or spatial scales $1/\omega_i$ and $1/\omega_j$.

The terrain height may be written as follows:

$$h(x, y) = \sum \sum a_{i,j} \sin\left(2\pi\left(\frac{iX}{n} + \frac{jy}{m}\right) + \varphi_{i,j}\right)$$

The amplitudes $a_{i,j}$ and phases $\varphi_{i,j}$ can be found from h(x, y) with a fast Fourier transform (FFT). The amplitudes $a_{i,j}$ and phases $\varphi_{i,j}$ at a particular scale have wavelengths close to that scale. This is one approach for generation. At a given scale, choose a random phase $\varphi_{i,j}$ and keep the same amplitude, or vary the amplitudes a little. The displacement is taken care of in the sum.

A general transform uses a set of basis functions $\phi_{i,j}(x,y)$ $h(x,y) = \Sigma a_i \phi_i(x,y)$ Fourier transforms are global (sin( ) and cos( ) are non-zero most places). There is one amplitude and phase for each scale over all of (x, y) This is essentially fixing the spatial distribution/noise.

While the FFT may be used to estimate the "energy" (amplitude) in each spatial scale, the FFT does not provide data on the spatial distribution.

2. Spatial Distributions

A brute force approach to obtaining the spatial distribution is to use smoothing or a filtering on the terrain, and then sample the gradient of the filtered terrain on that scale to tabulate a distribution of gradients (e.g., obtain average size, then divide directions/angles into bins and count how many out of the total are in each direction). Random directions can then be generated with the same distribution.

Typically, however, a better approach to obtaining the spatial distribution is to use a local transformation. The smoothing used in the brute force approach accomplishes something like that—projecting onto a smoother spatially dependent basis.

In 2-D, there is a separate frequency for the x and y directions. The ratio of those frequencies gives the "orientation" to the basis function.

There are several approaches to local transforms. One approach is to use a window and calculate a FFT on the points in each cell. Each cell then gets a set of amplitudes and phases, and to generate a new distribution a random phase is provided in each cell. This can have artifacts across cell boundaries. This windowed FFT approach is like multiplying the terrain by a step function.

Another approach to local transforms is to use a local basis such as Wavelets. Wavelets are similar to the windowed FFT, but use overlapping windows, and multiply the terrain by a smoothed step function. Wavelets have a "Fast" algorithm for finding the coefficients which makes them useful in practice. They are used frequently for edge detection in image processing.

Taking the wavelet transform of a terrain gives a decomposition of the terrain into spatial frequencies that depend on position. The distribution of amplitudes for wavelets local to a particular point provides the amplitude of the displacements.

In accordance to some embodiments, the one or more fractal dimension extracting module(s) 420, given a terrain, may perform the following operations:
  calculating a discrete wavelet transform of the terrain (wherein each basis function of the discrete wavelet transformation has a position, orientation, and frequency); and
  for each of a plurality of scales from fine to coarse about the same frequency and different locations and orientations,
    tabulating, near each spatial location, the distribution of amplitude (at least average) and orientation, and
    generating, using the tabled distribution of amplitude and orientation, a spatial displacement at this scale.

In accordance with other embodiments, the one or more fractal dimension extracting module(s) 420, given a terrain, may calculate the FFT of the terrain to obtain an energy spectrum.

In some embodiments, the one or more synthetic bathymetry generating module(s) 422 of the synthetic bathymetry generation engine 402 may generate synthetic bathymetry of the water body based on the one or more fractal dimensions using one or more fractal terrain generation techniques.

In accordance with some embodiments, the one or more synthetic bathymetry generating module(s) 422 may perform the following operations:
  starting with a zero terrain/bathymetry height h(x, y) on a finest terrain/bathymetry grid sized nx×ny;
  for each of a plurality of scales coarser than the terrain/bathymetry resolution of the finest terrain/bathymetry grid, generating a spatial distribution of displacements at that scale from the tabled distribution of amplitude and orientation and the generated spatial displacement (respectively tabled and generated by the one or more fractal dimension extracting module(s) 420), interpolating the spatial distribution of displacement to the finest terrain/bathymetry grid and sum into the terrain/bathymetry height h(x, y).

In accordance with other embodiments, the one or more synthetic bathymetry generating module(s) 422 may generate a random distribution of Fourier coefficients with the same energy spectrum (obtained by the one or more fractal dimension extracting module(s) 420).

Figure 8:
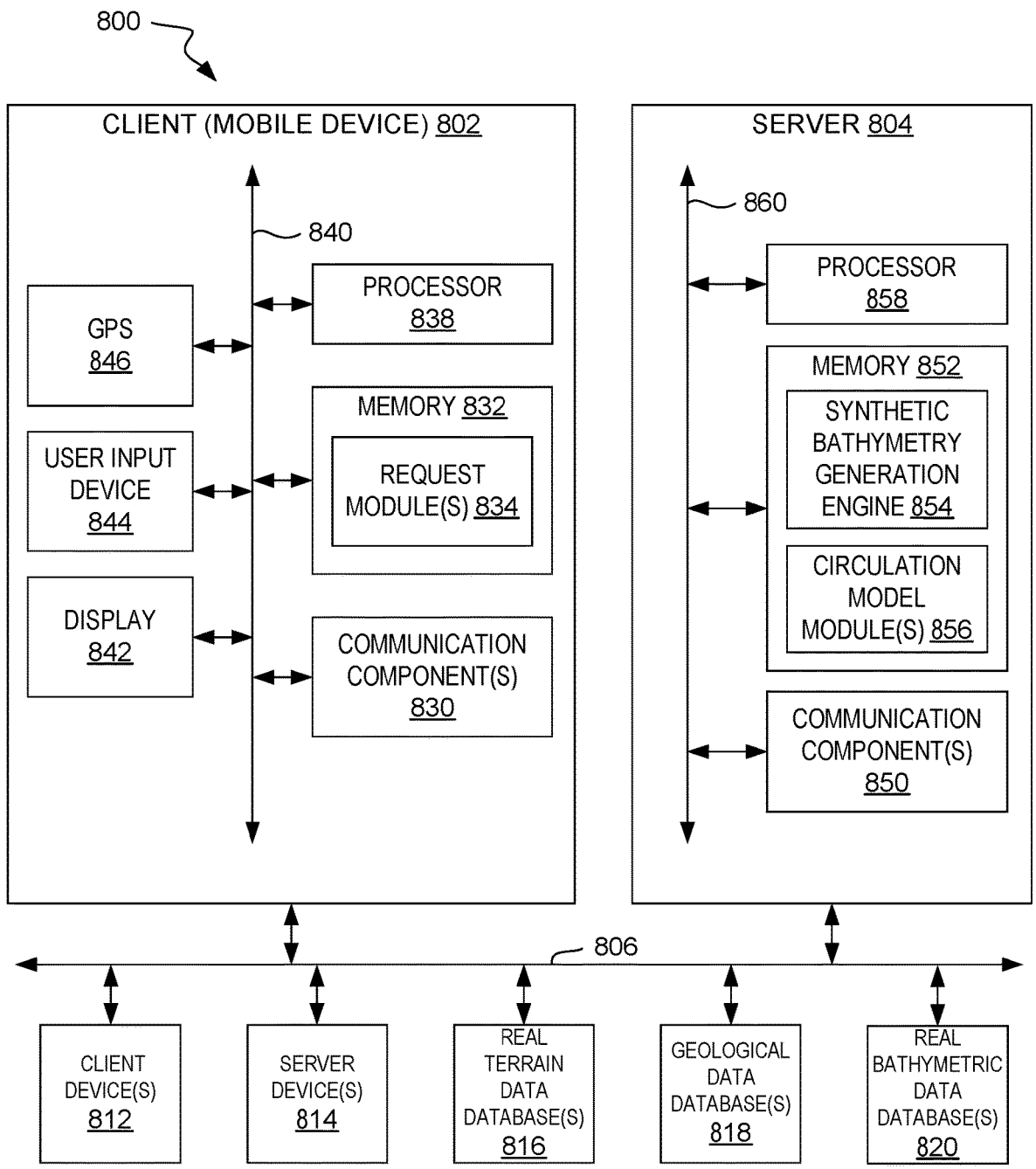
FIG. 8 depicts a block diagram of an example, non-limiting system that facilitates the generation of synthetic bathymetry, according to one or more embodiments.

Incorporated within the synthetic bathymetry generated by the synthetic bathymetry generation module(s) 422 may be known points, such as points along the shoreline of the water body (e.g., received from the real terrain data database 406) and, optionally, one or more points of underwater terrain (e.g., received from one or more real bathymetric data database(s) 820 in FIG. 8).

In some embodiments, the one or more synthetic bathymetry generating module(s) 422 may employ one or more feedback loops and iteratively apply different versions of the one or more fractal dimensions to the fractal terrain generation techniques, compare the results obtained in each iteration to one or more known data points (e.g., one or more points of underwater terrain from the real bathymetric data database 820 in FIG. 8), and select the iteration with the results closest to the one or more known data points. For example, the synthetic bathymetry generating module(s) 422 may employ one or more feedback loops to the one or more fractal dimension extracting module(s) 420 causing the one or more fractal dimension extracting module(s) 420 to utilize different data sets of real terrain data from which to respectively extract the different versions of the one or more fractal dimensions applied by the one or more synthetic bathymetry generating module(s) 422 in the respective iterations.

In some embodiments, the one or more geological process applying module(s) 424 of the synthetic bathymetry generation engine 402 may apply one or more simulated geological processes to the synthetic bathymetry. For example, the one or more simulated geological process applying module(s) 424 may apply a simulated sedimentation process and/or a simulated erosion process to soften the synthetic bathymetry.

To apply a simulated sedimentation process to the synthetic bathymetry of the water body, in accordance with some embodiments, the one or more geological process applying module(s) 424 may fill the local minima of the synthetic bathymetry based on an estimated total amount of sedimentation, which may be estimated based on the geological age of the water body and one or more sedimentation rates. For example, the one or more geological process applying module(s) 424 may search the geological data database 410 to identify the geological age of the water body and the one or more sedimentation rates, estimate the total amount of sedimentation based on the identified geological age of the water body and the one or more sedimentation rates, and fill the local minima of the synthetic bathymetry of the water body with the estimated total amount of sedimentation.

Conversely, to apply a simulated erosion process to the synthetic bathymetry of the water body, in accordance with some embodiments, the one or more geological process applying module(s) 424 may cut the local maxima of the synthetic bathymetry by an estimated total amount of erosion, which may be estimated based on the geological age of the water body and one or more erosion rates. For example, the one or more geological process applying module(s) 424 may search the geological data database 410 to identify the geological age of the water body and the one or more erosion rates, estimate the total amount of erosion based on the identified geological age of the water body and the one or more erosion rates, and cut the local maxima of the synthetic bathymetry of the water body by the estimated total amount of erosion.

In some embodiments, the one or more geological process applying module(s) 424 may employ one or more feedback loops to the one or more fractal dimension extracting module(s) 420 and/or to the one or more synthetic bathymetry generating module(s) 422 and iteratively apply the one or more simulated geological processes to different versions of the synthetic bathymetry, compare the results obtained in each iteration to one or more known data points (e.g., one or more points of underwater terrain from the real bathymetric data database 820 in FIG. 8), and select the iteration with the results closest to the one or more known data points. In an example implementation, different data sets of the real terrain data may be utilized by the one or more fractal dimension extracting module(s) 420 in the respective iterations. In another example implementation, different versions of the one or more fractal terrain generation techniques may be utilized by the one or more synthetic bathymetry generating module(s) 422 in the respective iterations.

In some embodiments, the one or more geological process applying module(s) 424 may iteratively apply different versions of the one or more simulated geological processes to the synthetic bathymetry, compare the results obtained in each iteration to one or more known data points (e.g., one or more points of underwater terrain from the real bathymetric data database 820 in FIG. 8), and select the iteration with the results closest to the one or more known data points. For example, the one or more geological process applying module(s) 424, in each iteration, may modify the geological age of the water body, the one or more sedimentation rates, and/or the one or more erosion rates.

Once generated, in accordance with some embodiments, the synthetic bathymetry generated by the synthetic bathymetry generation engine 402 (e.g., either as generated by the one or more synthetic bathymetry generating module(s) 422 or as smoothed by the one or more geological process applying module(s) 424) may be used in myriad applications. For example, the synthetic bathymetry generated by the synthetic bathymetry generation engine 402 may be output to one or more circulation model module(s) to drive a circulation model.

In some embodiments, one or more circulation model module(s) (e.g., the one or more circulation model module(s) 856 in FIG. 8) may employ one or more feedback loops and iteratively apply different versions of the synthetic bathymetry output by the synthetic bathymetry generation engine 854 to a circulation model, compare the results obtained in each iteration to one or more known data points (e.g., water temperature at one or more points in the water body), and select the iteration with the results closest to the one or more known data points. For example, the one or more circulation model module(s) may employ one or more feedback loops to the synthetic bathymetry generation engine 402 causing the synthetic bathymetry generation engine 402 to generate different versions of the synthetic bathymetry by implementing one or more modifications with respect to the one or more fractal dimension extracting module(s) 420, the one or more synthetic bathymetry generating module(s) 422, and/or the one or more geological process applying module(s) 422. In an example implementation, different data sets of the real terrain data may be utilized by the one or more fractal dimension extracting module(s) 420 in the respective iterations. In another example implementation, different versions of the one or more fractal terrain generation techniques may be utilized by the one or more synthetic bathymetry generating module(s) 422 in the respective iterations. In yet another example implementation, different data sets of the geological age of the water body, the one or more sedimentation rates, and/or the one or more erosion rates may be used by the one or more geological process applying module(s) 424 in the respective iterations.

Figure 5:
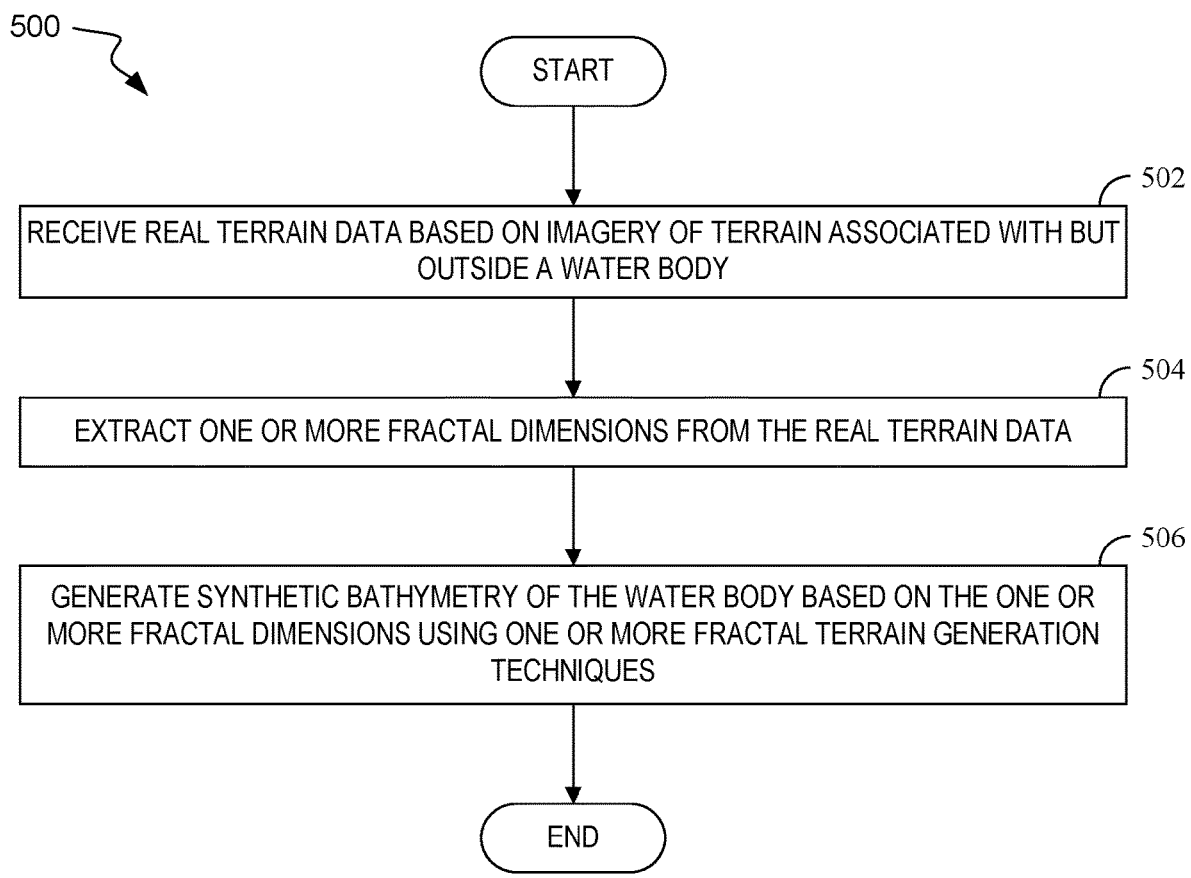
FIG. 5 depicts a flow diagram of an illustrative method of generating synthetic bathymetry, according to one or more embodiments.

Referring now to FIG. 5, a flow diagram of an illustrative method 500 of generating synthetic bathymetry is depicted, in accordance with one or more embodiments. The method 500 sets forth the preferred order of the blocks. It must be understood, however, that the various blocks may occur at any time relative to one another.

The method 500 begins by receiving real terrain data generated from sensor-based measurement of terrain associated with but outside a water body (block 502). For example, such real terrain data may be uploaded from a user electronic device (e.g., the cellular phone 404 in FIG. 4) as part of a synthetic bathymetry generation request and, at block 502, may be received by a synthetic bathymetry generation engine (e.g., the synthetic bathymetry generation engine 402 in FIG. 4) over a network (e.g., the network 408 in FIG. 4). The synthetic bathymetry generation engine may, for example, reside on one or more server systems (e.g., the one or more server systems 804, 814 in FIG. 8).

In some embodiments, the real terrain data received by the synthetic bathymetry generation engine may include real terrain data generated from sensor-based measurement (e.g., one or more space-based altitude data sets) of at least a portion of an area proximate the water body. The real terrain data received by the synthetic bathymetry generation engine may, in some embodiments, include shoreline data generated from sensor-based measurement of at least a portion of the shoreline of the water body.

A user of an electronic device (e.g., the cellular phone 404 in FIG. 4) may, in an example implementation, request generation of synthetic bathymetry of a water body. For example, the user may send a synthetic bathymetry generation request to the synthetic bathymetry generation engine (e.g., the synthetic bathymetry generation engine 402 in FIG. 4) over a network (e.g., the network 408 in FIG. 4).

The synthetic bathymetry generation request, in some embodiments, may include real terrain data. The user may, for example, upload a data file that contains real terrain data generated from sensor-based measurement (e.g., using a LiDAR sensor mounted on an aerial drone) of at least a portion of an area proximate the water body, including at least a portion of the shoreline of the water body.

In another example, at block 502, real terrain data may be received by a synthetic bathymetry generation engine (e.g., the synthetic bathymetry generation engine 402 in FIG. 4) from a real terrain data database (e.g., the real terrain data database 406 in FIG. 4) over a network (e.g., the network 408 in FIG. 4) responsive to the synthetic bathymetry generation engine receiving a synthetic bathymetry generation request from a user electronic device (e.g., the cellular phone 404 in FIG. 4) and the synthetic bathymetry generation engine then querying the real terrain data database to identify real terrain data generated from sensor-based measurement (e.g., one or more space-based altitude data sets) of at least a portion of an area proximate the water body, including at least a portion of the shoreline of the water body.

The method 500 continues by extracting one or more fractal dimensions from the real terrain data (block 504). For example, at block 504, one or more fractal dimension extracting module(s) (e.g., the one or more fractal dimension extracting module(s) 420 in FIG. 4) of the synthetic bathymetry generation engine may extract one or more fractal dimensions from the real terrain data (received at block 502).

The method 500 then continues by generating synthetic bathymetry of the water body based on the one or more fractal dimensions using one or more fractal terrain generation techniques (block 506). For example, at block 506, one or more synthetic bathymetry generating module(s) (e.g., the one or more synthetic bathymetry generating module(s) 422 in FIG. 4) of the synthetic bathymetry generation engine may generate synthetic bathymetry of the water body based on the one or more fractal dimensions (extracted at block 504) using one or more fractal terrain generation techniques and constrained by the shoreline data (received at block 502).

In some embodiments, the synthetic bathymetry of the water body generated by the one or more synthetic bathymetry module(s) at block 506 may be returned to the user electronic device (e.g., the cellular phone 404 in FIG. 4) from the synthetic bathymetry generation engine (e.g., the synthetic bathymetry generation engine 402 in FIG. 4) over a network (e.g., the network 408 in FIG. 4).

Figure 6:
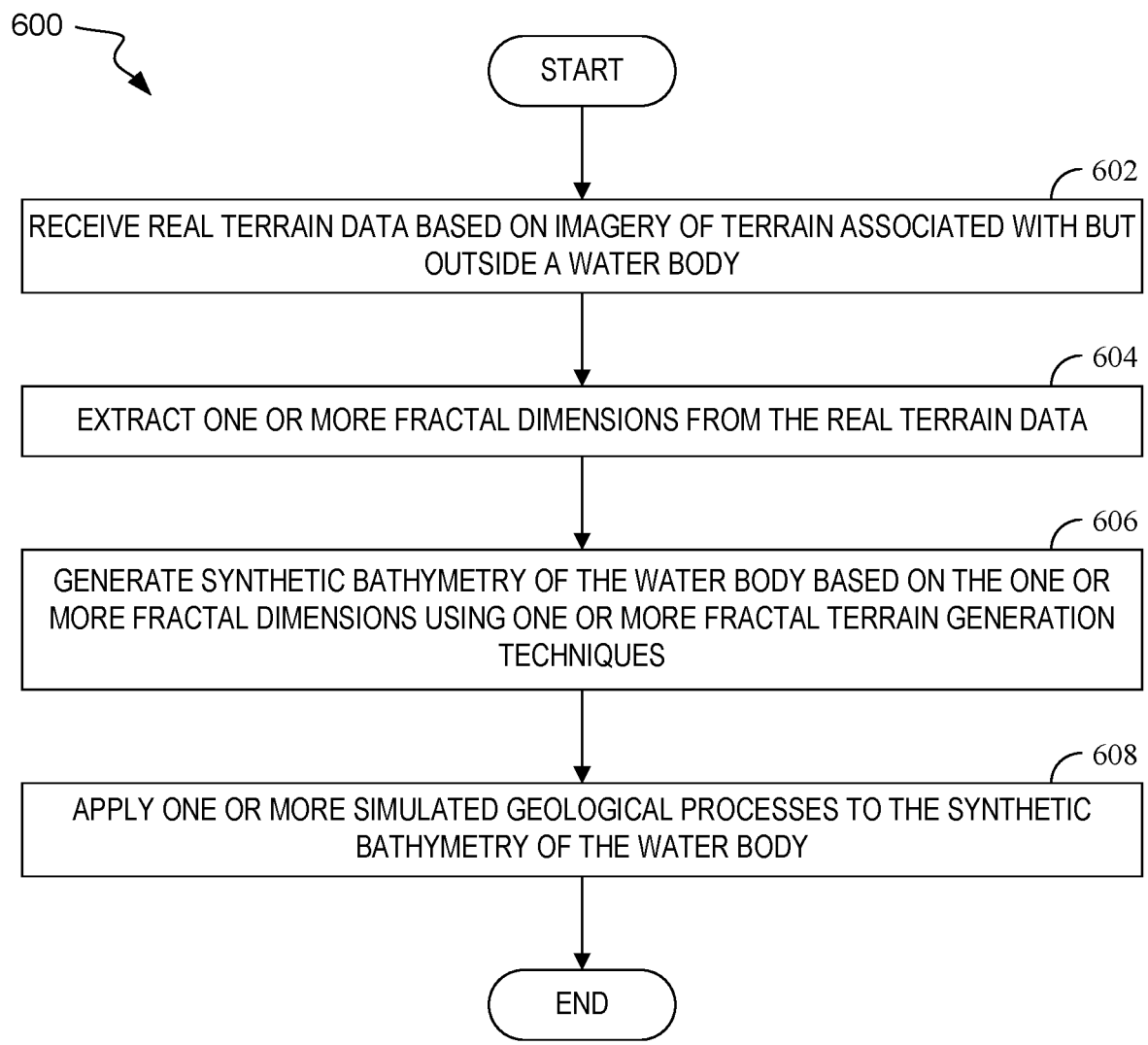
FIG. 6 depicts a flow diagram of another illustrative method of generating synthetic bathymetry, according to one or more embodiments.

Referring now to FIG. 6, a flow diagram of another illustrative method 600 of generating synthetic bathymetry is depicted, in accordance with one or more embodiments. The method 600 sets forth the preferred order of the blocks. It must be understood, however, that the various blocks may occur at any time relative to one another.

The method 600 begins by receiving real terrain data generated from sensor-based measurement of terrain associated with but outside a water body (block 602). For example, such real terrain data may be uploaded from a user electronic device (e.g., the cellular phone 404 in FIG. 4) as part of a synthetic bathymetry generation request and, at block 602, may be received by a synthetic bathymetry generation engine (e.g., the synthetic bathymetry generation engine 402 in FIG. 4) over a network (e.g., the network 408 in FIG. 4). The synthetic bathymetry generation engine may, for example, reside on one or more server systems (e.g., the one or more server systems 804, 814 in FIG. 8).

In some embodiments, the real terrain data received by the synthetic bathymetry generation engine may include real terrain data generated from sensor-based measurement (e.g., one or more space-based altitude data sets) of at least a portion of an area proximate the water body. The real terrain data received by the synthetic bathymetry generation engine may, in some embodiments, include shoreline data generated from sensor-based measurement of at least a portion of the shoreline of the water body.

A user of an electronic device (e.g., the cellular phone 404 in FIG. 4) may, in an example implementation, request generation of synthetic bathymetry of a water body. For example, the user may send a synthetic bathymetry generation request to the synthetic bathymetry generation engine (e.g., the synthetic bathymetry generation engine 402 in FIG. 4) over a network (e.g., the network 408 in FIG. 4).

The synthetic bathymetry generation request, in some embodiments, may include real terrain data. The user may, for example, upload a data file that contains real terrain data generated from sensor-based measurement (e.g., using a LiDAR sensor mounted on an aerial drone) of at least a portion of an area proximate the water body, including at least a portion of the shoreline of the water body.

In another example, at block 602, real terrain data may be received by a synthetic bathymetry generation engine (e.g., the synthetic bathymetry generation engine 402 in FIG. 4) from a real terrain data database (e.g., the real terrain data database 406 in FIG. 4) over a network (e.g., the network 408 in FIG. 4) responsive to the synthetic bathymetry generation engine receiving a synthetic bathymetry generation request from a user electronic device (e.g., the cellular phone 404 in FIG. 4) and the synthetic bathymetry generation engine then querying the real terrain data database to identify real terrain data generated from sensor-based measurement (e.g., one or more space-based altitude data sets) of at least a portion of an area proximate the water body, including at least a portion of the shoreline of the water body.

The method 600 continues by extracting one or more fractal dimensions from the real terrain data (block 604). For example, at block 604, one or more fractal dimension extracting module(s) (e.g., the one or more fractal dimension extracting module(s) 420 in FIG. 4) of the synthetic bathymetry generation engine may extract one or more fractal dimensions from the real terrain data (received at block 602).

The method 600 then continues by generating synthetic bathymetry of the water body based on the one or more fractal dimensions using one or more fractal terrain generation techniques (block 606). For example, at block 606, one or more synthetic bathymetry generating module(s) (e.g., the one or more synthetic bathymetry generating module(s) 422 in FIG. 4) of the synthetic bathymetry generation engine may generate synthetic bathymetry of the water body based on the one or more fractal dimensions (extracted at block 604) using one or more fractal terrain generation techniques and constrained by the shoreline data (received at block 602).

The method 600 may then continue by applying one or more simulated geological processes to the synthetic bathymetry of the water body (block 608). For example, at block 608, one or more geological process applying module(s) (e.g., the one or more geological process applying module(s) 424 in FIG. 4) of the synthetic bathymetry generation engine may apply a simulated sedimentation process and/or a simulated erosion process to soften the synthetic bathymetry.

To apply a simulated sedimentation process to the synthetic bathymetry of the water body, in accordance with some embodiments, at block 608, the one or more geological process applying module(s) may fill the local minima of the synthetic bathymetry based on an estimated total amount of sedimentation, which may be estimated based on the geological age of the water body and one or more sedimentation rates. For example, the one or more geological process applying module(s) may search one or more geological data databases (e.g., the geological data database 410) to identify the geological age of the water body and the one or more sedimentation rates, estimate the total amount of sedimentation based on the identified geological age of the water body and the one or more sedimentation rates, and fill the local minima of the synthetic bathymetry of the water body with the estimated total amount of sedimentation.

Conversely, to apply a simulated erosion process to the synthetic bathymetry of the water body, in accordance with some embodiments, at block 608, the one or more geological process applying module(s) may cut the local maxima of the synthetic bathymetry by an estimated total amount of erosion, which may be estimated based on the geological age of the water body and one or more erosion rates. For example, the one or more geological process applying module(s) may search one or more geological data databases (e.g. the geological data database 410) to identify the geological age of the water body and the one or more erosion rates, estimate the total amount of erosion based on the identified geological age of the water body and the one or more erosion rates, and cut the local maxima of the synthetic bathymetry of the water body by the estimated total amount of erosion.

In some embodiments, the synthetic bathymetry of the water body with the one or more simulated geological processes applied by the one or more geological process applying module(s) at block 608 may be returned to the user electronic device (e.g., the cellular phone 404 in FIG. 4) from the synthetic bathymetry generation engine (e.g., the synthetic bathymetry generation engine 402 in FIG. 4) over a network (e.g., the network 408 in FIG. 4).

Figure 7:
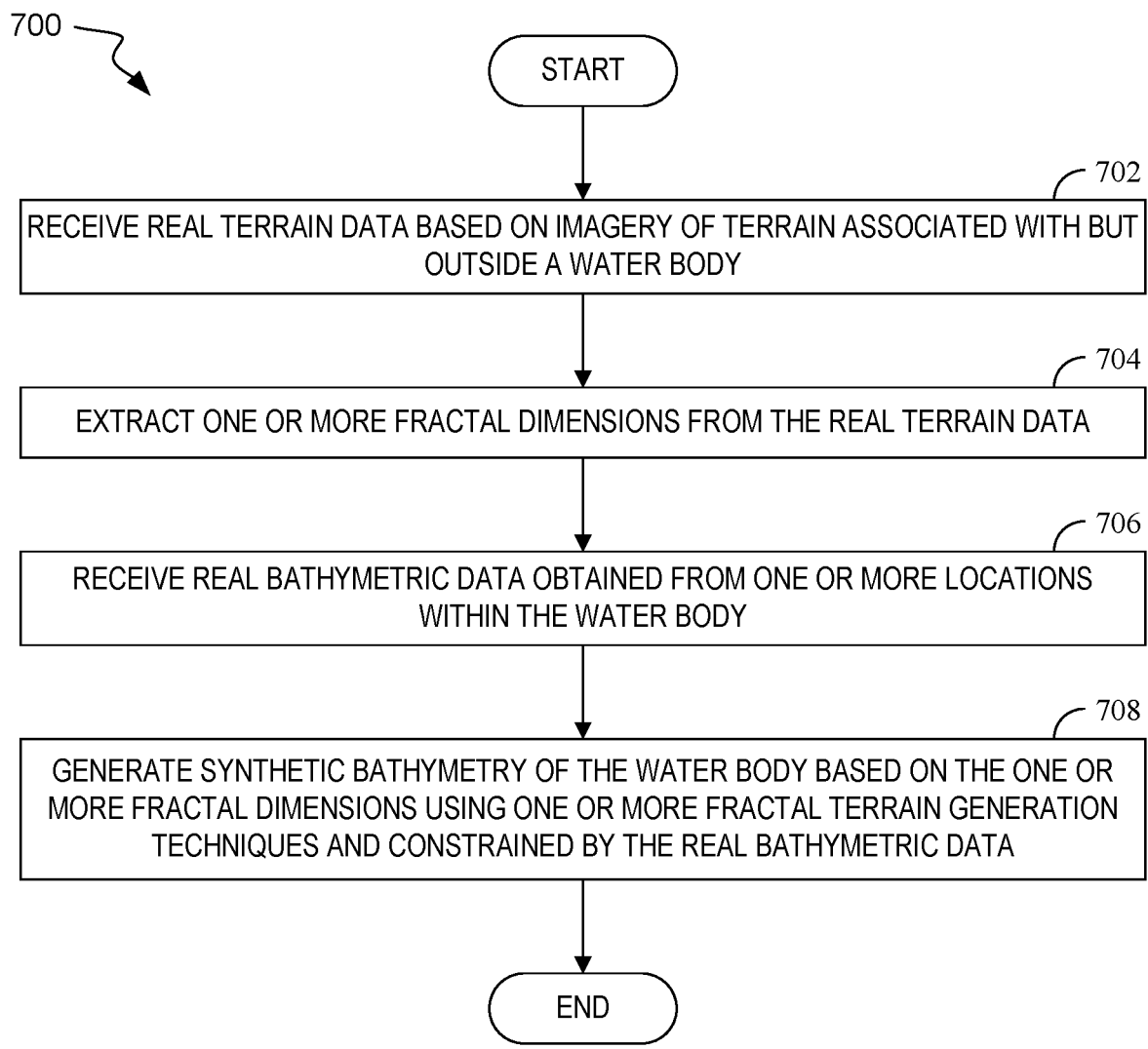
FIG. 7 depicts a flow diagram of yet another illustrative method of generating synthetic bathymetry, according to one or more embodiments.

Referring now to FIG. 7, a flow diagram of yet another illustrative method 700 of generating synthetic bathymetry is depicted, in accordance with one or more embodiments. The method 700 sets forth the preferred order of the blocks. It must be understood, however, that the various blocks may occur at any time relative to one another.

The method 700 begins by receiving real terrain data generated from sensor-based measurement of terrain associated with but outside a water body (block 702). For example, such real terrain data may be uploaded from a user electronic device (e.g., the cellular phone 404 in FIG. 4) as part of a synthetic bathymetry generation request and, at block 702, may be received by a synthetic bathymetry generation engine (e.g., the synthetic bathymetry generation engine 402 in FIG. 4) over a network (e.g., the network 408 in FIG. 4). The synthetic bathymetry generation engine may, for example, reside on one or more server systems (e.g., the one or more server systems 804, 814 in FIG. 8).

In some embodiments, the real terrain data received by the synthetic bathymetry generation engine may include real terrain data generated from sensor-based measurement (e.g., one or more space-based altitude data sets) of at least a portion of an area proximate the water body. The real terrain data received by the synthetic bathymetry generation engine may, in some embodiments, include shoreline data generated from sensor-based measurement of at least a portion of the shoreline of the water body.

A user of an electronic device (e.g., the cellular phone 404 in FIG. 4) may, in an example implementation, request generation of synthetic bathymetry of a water body. For example, the user may send a synthetic bathymetry generation request to a synthetic bathymetry generation engine (e.g., the synthetic bathymetry generation engine 402 in FIG. 4) over a network (e.g., the network 408 in FIG. 4).

The synthetic bathymetry generation request, in some embodiments, may include such real terrain data. The user may, for example, upload a data file that contains real terrain data generated from sensor-based measurement (e.g., using a LiDAR sensor mounted on an aerial drone) of at least a portion of an area proximate the water body, including at least a portion of the shoreline of the water body.

In another example, at block 702, such real terrain data may be received by a synthetic bathymetry generation engine (e.g., the synthetic bathymetry generation engine 402 in FIG. 4) from a real terrain data database (e.g., the real terrain data database 406 in FIG. 4) over a network (e.g., the network 408 in FIG. 4) responsive to the synthetic bathymetry generation engine receiving a synthetic bathymetry generation request from a user electronic device (e.g., the cellular phone 404 in FIG. 4) and the synthetic bathymetry generation engine then querying the real terrain data database identify real terrain data generated from sensor-based measurement of terrain associated with but outside the water body, including at least a portion of the shoreline of the water body.

The method 700 continues by extracting one or more fractal dimensions from the real terrain data (block 704). For example, at block 704, one or more fractal dimension extracting module(s) (e.g., the one or more fractal dimension extracting module(s) 420 in FIG. 4) of the synthetic bathymetry generation engine may extract one or more fractal dimensions from the real terrain data (received at block 702).

Also, the method 700 continues by receiving real bathymetric data obtained from one or more locations within the water body (block 706). For example, such real bathymetric data may be uploaded from a user electronic device (e.g., the cellular phone 404 in FIG. 4) as part of the synthetic bathymetry generation request and, at block 706, may be received by the synthetic bathymetry generation engine over a network (e.g., the network 408 in FIG. 4). The user may, for example, upload a data file that contains real bathymetric data generated from sensor-based measurement (e.g., using an echo sounder mounted on a watercraft, manned or otherwise) of one or more points within the water body.

In another example, at block 706, such real bathymetric data may be received by the synthetic bathymetry generation engine from a real bathymetric data database (e.g., the real bathymetric data database 820 in FIG. 8) over a network (e.g., the network 408 in FIG. 4 or the network 806 in FIG. 8) responsive to the synthetic bathymetry generation engine receiving a synthetic bathymetry generation request from a user electronic device (e.g., the cellular phone 404 in FIG. 4) and the synthetic bathymetry generation engine then querying the real bathymetric data database to identify real bathymetric data generated from sensor-based measurement of one or more points within the water body.

The method 700 then continues by generating synthetic bathymetry of the water body based on the one or more fractal dimensions using one or more fractal terrain generation techniques and constrained by the real bathymetric data (block 708). For example, at block 708, one or more synthetic bathymetry generating module(s) (e.g., the one or more synthetic bathymetry generating module(s) 422 in FIG. 4) of the synthetic bathymetry generation engine may generate synthetic bathymetry of the water body based on the one or more fractal dimensions (extracted at block 704) using one or more fractal terrain generation techniques and constrained by both the shoreline data (received at block 702) and the real bathymetric data (received at block 706).

In some embodiments, the synthetic bathymetry of the water body with the real bathymetric data incorporated therein by the one or more synthetic bathymetry generation module(s) at block 708 may be returned to the user electronic device (e.g., the cellular phone 404 in FIG. 4) from the synthetic bathymetry generation engine (e.g., the synthetic bathymetry generation engine 402 in FIG. 4) over a network (e.g., the network 408 in FIG. 4).

Referring now to FIG. 8, a block diagram of an example, non-limiting system 800 is depicted that facilitates synthetic bathymetry generation, in accordance with one or more embodiments. Repetitive description of like elements employed in other embodiments described herein is omitted for the sake of brevity. Aspects of systems (e.g., system 800 and the like), apparatuses, or processes explained in this disclosure may constitute machine-executable program module(s) embodied within machine(s), e.g., embodied in one or more computer readable mediums (or media) associated with one or more machines. Such program module(s), when executed by the one or more machines, e.g., one or more computers, one or more computing devices, one or more virtual machines, etc., may cause the one or more machines to perform the operations described.

As shown in FIG. 8, the system 800 may include one or more client systems (e.g., mobile devices) 802, 812, one or more server systems 804, 814, one or more networks 806, one or more real terrain data databases 816, one or more geological data databases 818, and one or more real bathymetric data databases 820. It is to be appreciated that the one or more client systems 802, 812, the one or more server systems 804, 814, the one or more real terrain data databases 816, the one or more geological data databases 818, and the one or more real bathymetric data databases 820 may be equipped with communication devices (e.g., one or more communication components 830, described below, with respect to the client system 802) that enable communication between the one or more client systems 802, 812, the one or more server systems 804, 814, the one or more real terrain data databases 816, the one or more geological data databases 818, and the one or more real bathymetric data databases 820 over the one or more networks 806.

Client systems 802, 812 may include the functionality described herein with respect to requesting synthetic bathymetry generation and providing real terrain data and/or real bathymetric data. One or more client systems 802, 812 may be used to send synthetic bathymetry requests to the one or more server systems 804, 814 and to send real terrain data and/or real bathymetric data to the one or more server systems 804, 814. For example, requests for synthetic bathymetry of bodies of water may originate from users of the one or more client systems 802, 812 attempting to run a 3-D circulation model for each of those bodies of water. Client system 812 may be a different type of client system than client system 802. Client system 812 may also be a client system 802 and/or include one or more components of client system 802. It is to be appreciated that in discussions below where more than one client system is employed, the client system may include one or more client systems 802 and/or one or more client systems 812.

Client systems 802, 812 may include, for example, one or more mobile phones (e.g., the cellular phone 404 in FIG. 4), tablets, PDAs, laptops, or other mobile devices.

Server systems 804, 814 may include the functionality described herein with respect to generating synthetic bathymetry. Server system 814 may be a different type of server system than server system 804. Server system 814 may also be a server system 804 and/or include one or more components of server system 804. It is to be appreciated that in discussions below where more than one server system is employed, the server systems may include one or more server systems 804 and/or one or more server systems 814.

The various components (e.g., client systems 802, 812, server systems 804, 814, the one or more real terrain data databases 816, the one or more geological data databases 818, the one or more real bathymetric data databases 820, communication components 830, 850, memory 832, 852, processor 838, 858, display 842, keyboard 844, GPS 846, and/or other components) of system 800 may be connected directly or via one or more networks 806. Such networks 806 may include wired and wireless networks, including, but not limited to, a cellular network, a wide area network (WAN) (e.g., the Internet), and/or a local area network (LAN), non-limiting examples of which include cellular, WAN, wireless fidelity (Wi-Fi), Wi-Max, WLAN, radio communication, microwave communication, satellite communication, optical communication, sonic communication, electromagnetic induction communication, quantum communication, and/or any other suitable communication technology.

Client system 802 may include one or more communication components 830 that enable client system 802 to communicate with one or more server systems 804, 814, one or more other client devices 812, the one or more real terrain data databases 816, the one or more geological data databases 818, and/or the one or more real bathymetric data databases 820 over one or more networks 806 via wireless and/or wired communications. For example, the one or more communication components 830 may correspond to network adapter 20 in FIG. 1.

Client system 802 may include or otherwise be associated with at least one memory 832 that may store computer executable program module(s) (e.g., computer executable program module(s) may include, but are not limited to, synthetic bathymetry request module(s) 834 and associated program module(s)). Synthetic bathymetry request module(s) 834 may correspond to program modules 42 in FIG. 1. Client system 802 may also include or otherwise be associated with at least one processor 838 that executes the computer executable program module(s) stored in the memory 832. Client system 802 may further include a system bus 840 that may couple the various components including, but not limited to, communication component(s) 830, memory 832, processor 838, display 842, user input device 844, GPS 846, and/or other components (e.g., accelerometer, gyroscope, magnetometer).

While the client system 802 is shown in FIG. 8 as including synthetic bathymetry request module(s) 834, in other embodiments, any number of different types of devices may be associated with or include at least some of the synthetic bathymetry request module(s) 834. For example, one or more server systems 804, 814 may include at least some of the synthetic bathymetry request module(s) 834. In other words, data processing associated with requesting synthetic bathymetry generation and providing real terrain data and/or real bathymetric data may be performed locally (e.g., using the processor 838) and/or remotely (e.g., at server system 804 using processor 858). All such embodiments are envisaged.

Client system 802 may also include or otherwise be associated with at least one display 842 that may display a synthetic bathymetry generation request dialog box (e.g., the synthetic bathymetry generation request dialog box 412 in FIG. 4), as well as information related to using the synthetic bathymetry request module(s) 834. The display 842 may also display the synthetic bathymetry generated responsive to the request. The display 842 may be any suitable display device. For example, the display 842 may be a display that is integrated into a mobile phone, tablet, PDA, or laptop. In other embodiments, the display 842 may be a component of a device communicatively coupled to a mobile phone, tablet, PDA, or laptop. In some embodiments, the display 842 may be a touch screen that allows a user to interact with the client system 802 using her/his finger or stylus.

Client system 802 may also include or otherwise be associated with at least one user input device 844, such as a keyboard and/or a pointing device (e.g., a graphics tablet, mouse, stylus, pointing stick, trackball, etc.), by which a user may provide input data (e.g., login credentials, the identity of the water body for which generation of synthetic bathymetry is requested, etc.). The user input device 844 may be any suitable user input device. For example, the user input device 844 may be a keyboard and/or a pointing device integrated into a mobile phone, tablet, PDA, or laptop. In other embodiments, the user input device 844 may be a component of a device communicatively coupled to a mobile phone, tablet, PDA, or laptop.

Client system 802 may also include or otherwise be associated with at least one GPS 846 that may provide geolocation data (e.g., geolocation data defining the location of the client system 802). The GPS 846 may be any suitable global satellite-based geolocation system, such as the Global Positioning System (GPS), GLObal Navigation Satellite System (GLONASS), Galileo, Quasi-Zenith Satellite System (QZSS), etc. For example, the GPS 846 may be a global satellite-based geolocation system that is integrated into a mobile phone, tablet, PDA, or laptop. In other embodiments, the GPS 846 may be a component of a device communicatively coupled to a mobile phone, tablet, PDA, or laptop.

Server device 804 may include one or more communication components 850 that enable server device 804 to communicate with one or more client systems 802, 812, one or more other server devices 814, the one or more real terrain data databases 816, the one or more geological data databases 818, and/or the one or more real bathymetric data databases 820 over one or more networks 806 via wireless and/or wired communications. For example, the one or more communication components 850 may correspond to network adapter 20 in FIG. 1.

Server system 804 may include or otherwise be associated with at least one memory 852 that may store computer executable program module(s) (e.g., computer executable program module(s) may include, but are not limited to, synthetic bathymetry generation engine 854, one or more circulation model module(s) 856, and associated program module(s)). Synthetic bathymetry generation engine 854 may correspond to the program modules 42 in FIG. 1. Synthetic bathymetry generation engine 854 may also correspond to the synthetic bathymetry generation engine 402 in FIG. 4. The synthetic bathymetry generated by the synthetic bathymetry generation engine 854 may be output to the one or more circulation model module(s) 856 to drive at least one circulation model. The one or more circulation model module(s) 856 may, for example, include one or more modules that implement a circulation model used to track spills in a water body. Server system 804 may also include or otherwise be associated with at least one processor 858 that executes the computer executable program module(s) stored in the memory 852. Server system 804 may further include a system bus 860 that may couple the various components including, but not limited to, communication component(s) 850, memory 852, processor 858, and/or other components.

While the server system 804 is shown in FIG. 8 as including the synthetic bathymetry generation engine 854 and the one or more circulation model module(s) 856, in other embodiments, any number of different types of devices may be associated with or include all or some of the synthetic bathymetry generation engine 854 and/or the one or more circulation model module(s) 856. For example, one or more client systems 802, 812 may include at least some of the synthetic bathymetry generation engine 854 and/or the one or more circulation model module(s) 856. In other words, data processing associated with the synthetic bathymetry generation engine 854 and/or the one or more circulation model module(s) 856 may be performed locally (e.g., using the processor 858) and/or remotely (e.g., at client system 802 using processor 838). All such embodiments are envisaged.

The one or more real terrain data databases 816 may be any database that contains real terrain data, non-limiting examples of which include one or more databases that store real terrain data generated from sensor-based measurement (e.g., using satellite, aircraft, drone, and the like) of overland terrain. Real terrain data may include, for example, one or more digital elevation maps (DEMs) of overland terrain, including shoreline data defining the shape and features of the shoreline. The one or more real terrain data databases 816 may correspond to the real terrain data database 406 in FIG. 4.

The one or more geological data databases 818 may be any database containing geological data, non-limiting examples of which include one or more databases that store geological ages of bodies of water, sedimentation rates, erosion rates, and the like. The one or more geological data databases 818 may correspond to the geological data database 410 in FIG. 4.

The one or more real bathymetric data databases 820 may be any database that contains real bathymetric data, non-limiting examples of which include one or more databases that store real bathymetric data generated from sensor-based measurement (e.g., using an echo sounder mounted on a boat) of one or more points of underwater terrain, and the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In one or more embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects are described herein with reference to flowchart illustrations and/or block diagrams of methods, apparatus (systems), and computer program products according to one or more embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One skilled in the art will appreciate that many variations are possible within the scope of the present invention. For example, the particular hardware and software implementation details described herein are merely for illustrative purposes and are not meant to limit the scope of the described subject matter. Thus, while the present invention has been particularly shown and described with reference to preferred embodiments thereof, it will be understood by those skilled in the art that changes in form and details may be made therein without departing from the spirit and scope of the present invention.

What is claimed is:

1. A computer-implemented method of generating synthetic bathymetry detailing a shape of a bottom of a water body, the method comprising:
   receiving, at a server device, real terrain data generated from sensor-based measurement of terrain associated with but outside the water body;
   extracting, at the server device, one or more fractal dimensions from the real terrain data;
   generating, at the server device, synthetic bathymetry of the water body based on the one or more fractal dimensions from the real terrain data outside the water body using one or more fractal terrain generation techniques, the synthetic bathymetry of the water body displaying a shape of the bottom of the water body.

2. The method as recited in claim 1, further comprising:
   applying one or more simulated geological processes, at the server device, to the synthetic bathymetry of the water body.

3. The method as recited in claim 2, wherein the one or more simulated geological processes includes a simulated sedimentation process and/or a simulated erosion process to soften the synthetic bathymetry of the water body.

4. The method as recited in claim 3, wherein the simulated sedimentation process applied to the synthetic bathymetry of the water body is based on the geological age of the water body and one or more sedimentation rates.

5. The method as recited in claim 3, wherein the simulated erosion process applied to the synthetic bathymetry of the water body is based on the geological age of the water body and one or more erosion rates.

6. The method as recited in claim 1, wherein the real terrain data generated from sensor-based measurement of terrain associated with but outside a water body includes real terrain data generated from sensor-based measurement of at least a portion of an area proximate the water body.

7. The method as recited in claim 1, further comprising:
   receiving, at the server device, real bathymetric data obtained from one or more locations within the water body.

8. The method as recited in claim 7, wherein generating, at the server device, synthetic bathymetry of the water body based on the one or more fractal dimensions using one or more fractal terrain generation techniques includes constraining the synthetic bathymetry by the real bathymetric data.

9. The method as recited in claim 1, wherein extracting, at the server device, one or more fractal dimensions from the real terrain data includes calculating a fast Fourier transform of the real terrain data to obtain an energy spectrum.

10. The method as recited in claim 9, wherein generating, at the server device, synthetic bathymetry of the water body based on the one or more fractal dimensions using one or more fractal terrain generation techniques includes generating a random distribution of Fourier coefficients with the obtained energy spectrum.

11. The method as recited in claim 1, wherein extracting, at the server device, one or more fractal dimensions from the real terrain data includes:
    calculating a discrete wavelet transform of the real terrain data, wherein each basis function of the discrete wavelet transform has a position, orientation, and frequency;
    for each of a plurality of scales from fine to coarse about the same frequency and different spatial locations and orientations,
    tabulating, near each spatial location, the distribution of amplitude and orientation, and
    generating, using the tabled distribution of amplitude and orientation, a spatial displacement at that scale.

12. The method as recited in claim 11, wherein generating, at the server device, synthetic bathymetry of the water body based on the one or more fractal dimensions using one or more fractal terrain generation techniques includes:
    starting with a zero terrain/bathymetry height $h(x, y)$ on a finest terrain/bathymetry grid sized $nx \times ny$;
    for each of a plurality of scales coarser than the terrain/bathymetry resolution of the finest terrain/bathymetry grid,
    generating a spatial distribution of displacements at that scale from the tabled distribution of amplitude and orientation and the generated spatial displacement,
    interpolating the spatial distribution of displacement to the finest terrain/bathymetry grid and sum into the terrain/bathymetry height $h(x, y)$.

13. A system for generating synthetic bathymetry detailing a shape of a bottom of a water body, comprising:
    a server device, wherein the server device comprises one or more processors, one or more computer readable storage devices, and program instructions stored on at least one of the one or more computer readable storage devices for execution by at least one of the one or more processors, the program instructions executable to:
    receive real terrain data generated from sensor-based measurement of terrain associated with but outside the water body;
    extract one or more fractal dimensions from the real terrain data;
    generate synthetic bathymetry of the water body based on the one or more fractal dimensions from the real terrain data outside the water body using one or more fractal terrain generation techniques, the synthetic bathymetry of the water body displaying a shape of the bottom of the water body.

14. The system as recited in claim 13, the program instructions further executable to:
apply one or more simulated geological processes to the synthetic bathymetry of the water body.

15. The system as recited in claim 14, wherein the one or more simulated geological processes includes a simulated sedimentation process and/or a simulated erosion process to soften the synthetic bathymetry of the water body.

16. The system as recited in claim 13, wherein the real terrain data generated from sensor-based measurement of terrain associated with but outside a water body includes real terrain data generated from sensor-based measurement of at least a portion of an area proximate the water body.

17. A computer program product for generating synthetic bathymetry detailing a shape of a bottom of a water body, the computer program product comprising a computer readable storage medium having program code embodied therewith, the program code executable by one or more processors, to perform a method comprising:
receiving, at a server device, real terrain data generated from sensor-based measurement of terrain associated with but outside the water body;
extracting, at the server device, one or more fractal dimensions from the real terrain data;
generating, at the server device, synthetic bathymetry of the water body based on the one or more fractal dimensions from the real terrain data outside the water body using one or more fractal terrain generation techniques, the synthetic bathymetry of the water body displaying a shape of the bottom of the water body.

18. The computer program product as recited in claim 17, the method further comprising:
applying one or more simulated geological processes, at the server device, to the synthetic bathymetry of the water body.

19. The computer program product as recited in claim 18, wherein the one or more simulated geological processes includes a simulated sedimentation process and/or a simulated erosion process to soften the synthetic bathymetry of the water body.

20. The computer program product as recited in claim 17, wherein the real terrain data generated from sensor-based measurement of terrain associated with but outside a water body includes real terrain data generated from sensor-based measurement of at least a portion of an area proximate the water body.

* * * * *